United States Patent
Dai et al.

(10) Patent No.: US 10,823,945 B2
(45) Date of Patent: Nov. 3, 2020

(54) METHOD FOR MULTI-COLOR FLUORESCENCE IMAGING UNDER SINGLE EXPOSURE, IMAGING METHOD AND IMAGING SYSTEM

(71) Applicant: TSINGHUA UNIVERSITY, Beijing (CN)

(72) Inventors: Qionghai Dai, Beijing (CN); Xingye Chen, Beijing (CN); Jiamin Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 503 days.

(21) Appl. No.: 15/615,180

(22) Filed: Jun. 6, 2017

(65) Prior Publication Data
US 2018/0196244 A1    Jul. 12, 2018

(30) Foreign Application Priority Data

Jan. 10, 2017   (CN) .......................... 2017 1 0016513
Apr. 10, 2017   (CN) .......................... 2017 1 0231171

(51) Int. Cl.
    G02B 21/00           (2006.01)
    H04N 13/257          (2018.01)
    G02B 21/16           (2006.01)

(52) U.S. Cl.
CPC ..... *G02B 21/0032* (2013.01); *G02B 21/0064* (2013.01); *G02B 21/16* (2013.01); *H04N 13/257* (2018.05)

(58) Field of Classification Search
CPC ................ G02B 21/0032; G02B 21/16; G02B 21/0064; G02B 2006/12107; H04N 13/257; G01N 21/6456; G01N 23/041
See application file for complete search history.

(56) References Cited

U.S. PATENT DOCUMENTS 5,936,731 A * 8/1999 Cabib ...................... A61B 3/12
                                                  250/339.02
8,824,544 B2 * 9/2014 Nguyen .............. G01S 13/0209
                                                   375/224

(Continued)

FOREIGN PATENT DOCUMENTS

CN        104063857 A       9/2014
CN        104316179 A       1/2015

(Continued)

OTHER PUBLICATIONS

Chinese Office Action dated Jan. 4, 2019 for Chinese Application No. 201710016513.5.

(Continued)

*Primary Examiner* — Mekonen T Bekele
(74) *Attorney, Agent, or Firm* — David D. Brush; Westman, Champlin & Koehler, P.A.

(57) ABSTRACT

The present disclosure relates to a method for multi-color fluorescence imaging under a single exposure, an imaging method and system. The imaging system includes: a fluorescence microscope, configured to obtain a real image of the sample; a spatial mask, disposed behind the fluorescence microscope, and configured to perform mask modulation on the real image of the sample; a 4f system, disposed behind the spatial mask, in which the real image of the sample passes through the spatial mask to the 4f system; an optical granting, disposed on a Fourier plane in middle of the 4f system, and configured to split the real image of the sample to obtain a split real image; and an image sensor, configured to obtain the split real image to obtain an image of the sample. The present disclosure advantages of improving imaging rate in multi-spectrum fluorescence microscopy.

6 Claims, 3 Drawing Sheets

(56) References Cited

U.S. PATENT DOCUMENTS

| | | | |
|---|---|---|---|
| 10,168,525 B2* | 1/2019 | Kim | G01N 21/6452 |
| 2003/0179373 A1* | 9/2003 | Magnusson | G01D 5/38 |
| | | | 356/328 |
| 2010/0020392 A1* | 1/2010 | Okugawa | G02B 21/008 |
| | | | 359/385 |
| 2012/0200901 A1* | 8/2012 | Dubois | G03H 1/02 |
| | | | 359/15 |
| 2013/0236115 A1* | 9/2013 | Nguyen | G01S 13/0209 |
| | | | 382/260 |
| 2014/0093949 A1* | 4/2014 | Norton | G01N 15/1459 |
| | | | 435/288.7 |
| 2016/0091372 A1* | 3/2016 | Zhu | G02B 7/28 |
| | | | 356/498 |
| 2016/0266366 A1* | 9/2016 | Chung | G02B 21/0072 |
| 2017/0276597 A1* | 9/2017 | Emoto | G01N 21/23 |

FOREIGN PATENT DOCUMENTS

| | | | |
|---|---|---|---|
| CN | 204269552 U | * | 4/2015 |
| CN | 204269552 U | | 4/2015 |
| CN | 106441085 A | | 2/2017 |

OTHER PUBLICATIONS

English translation of Chinese Office Action dated Jan. 4, 2019 for Chinese Application No. 201710016513.5.
Chinese Office Action dated Dec. 18, 2018 for Chinese Application No. 201710231171.9.
English translation of Chinese Office Action dated Dec. 18, 2018 for Chinese Application No. 201710231171.9.

* cited by examiner

METHOD FOR MULTI-COLOR FLUORESCENCE IMAGING UNDER SINGLE EXPOSURE, IMAGING METHOD AND IMAGING SYSTEM

CROSS-REFERENCE TO RELATED APPLICATION

This application is based on and claims a priority to Chinese Patent Application Serial Nos. 201710016513.5, filed on Jan. 10, 2017, and 201710231171.9, filed on Apr. 10, 2017, the entire content of which are incorporated herein by reference.

FIELD

The present disclosure relates to microscopy imaging field, and more particularly to a method for multi-color fluorescence imaging under a single exposure, an imaging method, and an imaging system.

BACKGROUND

In life science field, most samples are transparent. When a transparent sample is observed, the sample is labeled by fluorescence dyes, such that the sample can be observed via fluorescence. In a process of labeling, fluorescence of different spectrums may be used for labeling, thus obtain an image with overlap of multiple spectral channels. Distinguishing the overlap of multiple spectral channels in the image helps is to study a certain structure of the sample.

SUMMARY

An imaging system is provided in embodiments of the present disclosure. The system includes: a fluorescence microscope, in which the fluorescence microscope includes a laser source and an objective lens, a sample is disposed on a focal plane of the objective lens, the laser source is configured to emit lasers to illuminate the sample, the objective lens is configured to magnify the sample illuminated by the lasers to an image plane of the objective lens, to obtain a real image of the sample; a spatial mask, disposed on the image plane of the objective lens, and configured to perform mask modulation on the real image of the sample; a 4f system, disposed behind the spatial mask, in which a beam of the real image of the sample passes through the spatial mask to the 4f system; an optical grating, disposed on a Fourier plane in middle of the 4f system, and configured to split the beam of the real image of the sample to obtain split beams of the real image; and an image sensor, configured to obtain the split beams of the real image to obtain an image of the sample.

In an embodiment of the present disclosure, the spatial mask is disposed on a front focal plane of the 4f system.

In an embodiment of the present disclosure, the system further includes: a reflector, configured to reflect the real image of the sample to the spatial mask.

In an embodiment of the present disclosure, lights having different wavelengths pass through the optical grating so as to have different deflection angles respectively, and the lights having different deflection angles are converged into different points respectively on the image plane of the 4f system.

In an embodiment of the present disclosure, the spatial mask includes a preset mask mode.

In an embodiment of the present disclosure, the image sensor is a gray image sensor.

An imaging method is provided in embodiments of the present disclosure, applied in the imaging system according to any one of the above embodiments. The method includes: obtaining an image of the sample with the imaging system; obtaining at least one sparse representation coefficient of the image under a preset multi-spectrum over-complete dictionary, in which the multi-spectrum over-complete dictionary includes a plurality of over-complete dictionaries corresponding to a plurality of spectrum bands respectively; performing a spectrum separation on the image according to the at least one sparse representation coefficient and at least one spectrum band corresponding to the at least one sparse representation coefficient, to obtain a multi-spectrum image of the sample.

In an embodiment of the present disclosure, obtaining at least one sparse representation coefficient of the image under a preset multi-spectrum over-complete dictionary includes: solving the image with K-SVD algorithm according to the preset multi-spectrum over-complete dictionary, to obtain the at least one sparse representation coefficient.

In an embodiment of the present disclosure, the method further includes: establishing the preset multi-spectrum over-complete dictionary Establishing the preset multi-spectrum over-complete dictionary includes: labeling samples of different structures with different fluorescence, to obtain a plurality of multi-spectrum images; performing learning and training on the plurality of multi-spectrum images to obtain a plurality of original over-complete dictionaries, in which each of the plurality of original over-complete dictionaries corresponds to a spectrum band; obtaining a point spread function of the optical grating; performing convolution on the plurality of original over-complete dictionaries and the point spread function, to obtain the preset multi-spectrum over-complete dictionary.

A method for multi-color fluorescence imaging under a single exposure is provided in embodiments of the present disclosure, including: magnifying a fluorescence sample by an objective lens, to obtain a real image on a focal plane of the objective lens; reflecting a beam of the real image by a reflector to a 4f system, in which the reflector is disposed on the focal plane of the objective lens, and the focal plane of the objective lens is a front focal plane of the 4f system; splitting the beam of the real image by both the 4f system and an optical grating into split beams, in which the optical grating is disposed on a focal plane in middle of the 4f system; and obtaining the split beams by a collecting device to obtain the multi-color fluorescence image.

In an embodiment of the present disclosure, the method further includes: deflecting, by the optical grating, the beam having different wavelengths with different angles respectively, to realize splitting.

In an embodiment of the present disclosure, the collecting device realizes spectrum separation by a convolution algorithm.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
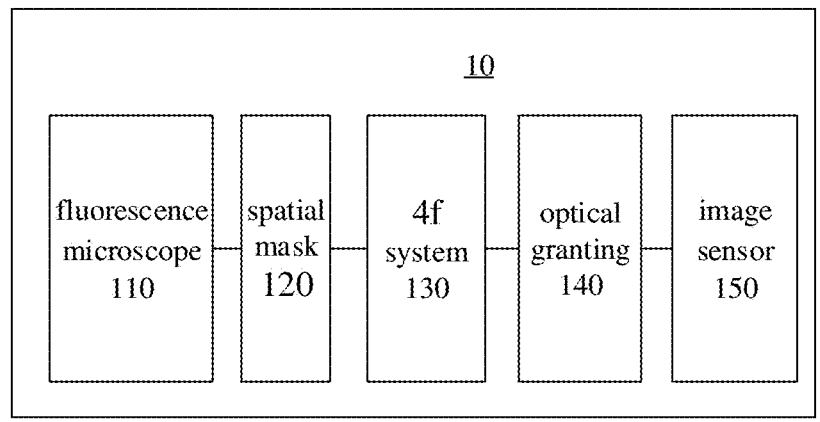
FIG. 1 is a schematic diagram of an imaging system according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In the description of the present disclosure, it should be understood that terms such as "central," "longitudinal," "lateral," "upper," "lower," "front," "rear," "left," "right," "vertical," "horizontal," "top," "bottom," "inner," and "outer," should be construed to refer to the orientation as then described or as shown in the drawings under discussion. These relative terms are for convenience of description and do not require that the present disclosure be constructed or operated in a particular orientation.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

Embodiments of the present disclosure will be described with reference to the drawings.

FIG. 1 is a schematic diagram of an imaging system according to an embodiment of the present disclosure. As illustrated in FIG. 1, the imaging system 10 includes a fluorescence microscope 110, a spatial mask 120, a 4f system 130, an optical grating 140 and an image sensor 150.

In an embodiment of the present disclosure, the fluorescence microscope 110 includes a laser source and an objective lens (not illustrated in FIG. 1). A sample is disposed on a focal plane of the objective lens. The laser source is configured to emit lasers. The lasers illuminate the sample. The objective lens is configured to magnify the sample illuminated by the lasers to an image plane of the objective lens, to obtain a real image of the sample. Specifically, the fluorescence microscope 110 may be a common fluorescence microscope in the related art. Other components of the fluorescence microscope 110 may refer to the related art, and can be known by those skilled in the art, which are not described in detail herein.

The spatial mask 120 is disposed on the image plane of the objective lens. The spatial mask 120 is configured to perform mask modulation on the real image of the sample. A purpose for using the spatial mask 120 is to reduce variables that need to be reconstructed in an algorithm for reconstructing a multi-spectrum image of the sample (which is described in following embodiments) and to improve imaging accuracy.

The 4f system 130 is disposed behind the spatial mask 120. A beam of the real image of the sample passes through the spatial mask 120 to the 4f system 130. The 4f system 130 includes two optical lenses having a focal distance of f, an object distance of f and image distance f. A distance between the two optical lenses is 2f.

The optical grating 140 is disposed on a Fourier plane in middle of the 4f system 130. The optical grating 140 is configured to split the beam of the real image of the sample to obtain split beams of the real image.

The image sensor 150 is configured to obtain the split beams of the real image to obtain an image of the sample.

Figure 2:
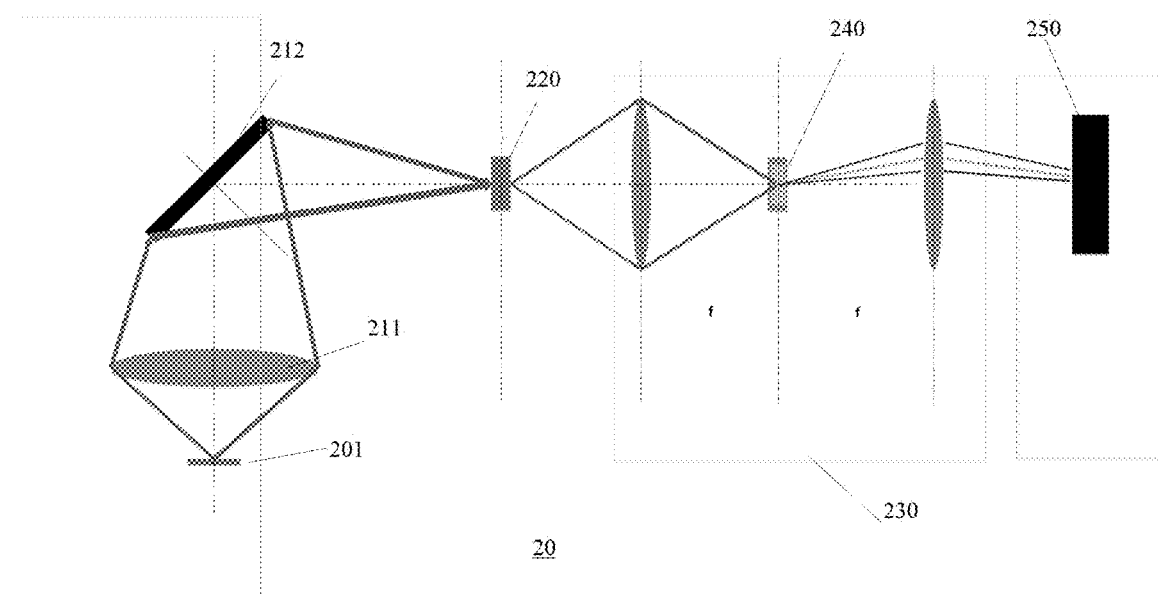
FIG. 2 is a schematic diagram of an imaging system according to an embodiment of the present disclosure.

FIG. 2 is a schematic diagram of an imaging system according to an embodiment of the present disclosure. As illustrated in FIG. 2, the imaging system 20 includes an objective lens 211, a reflector 212, a spatial mask 220, a 4f system 230, an optical grating 240, and an imaging sensor 250.

A sample 201 is disposed on a focal plane of the objective lens 211. The objective lens 211 magnifies the sample to an image plane thereof. The reflector 212 is disposed on the image plane of the objective lens 211. The reflector 212 is configured to reflect a beam of the real image of the sample to the spatial mask 220. The spatial mask 220 is disposed on the image plane of the objective lens 211 after reflection. A position of the spatial mask 220 is at a front focal plane of the 4f system 230. The optical grating 240 is disposed on a Fourier plane in middle of the 4f system 230. The image sensor 250 is disposed on an image plane behind the 4f system 230.

In embodiments of the present disclosure, the spatial mask 220 includes a preset mask mode, such as a random two-dimensional 0-1 mode.

In embodiments of the present disclosure, lights having different wavelengths pass through the optical grating 240 to have different deflection angles respectively, and the lights having different wavelengths may be converged into different points respectively on the image plane of the 4f system 230.

Figure 3:
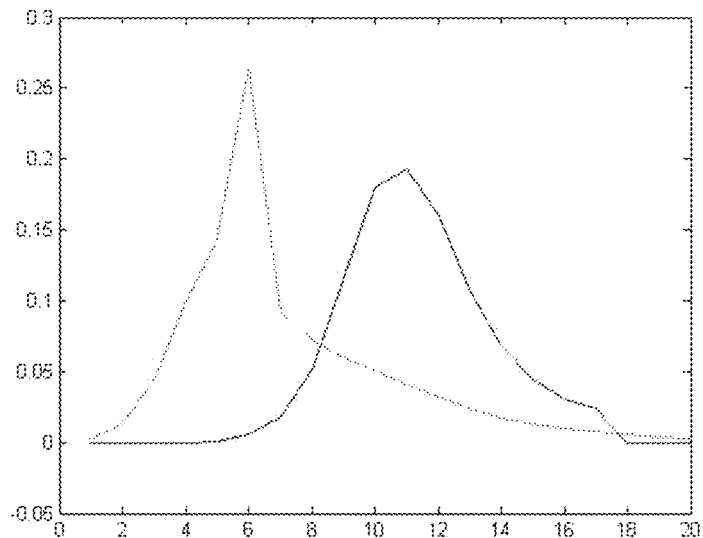
FIG. 3 is PSF modulation curves of two fluorescence spectrum bands according to an embodiment of the present disclosure.

It is different from a spectrum separation solution of an optical grating in the related art that, the optical grating 240 in this embodiment is disposed on the Fourier plane (i.e. the middle focal plane) of the 4f system 230 rather than on an image plane (i.e. a back focal plane) of the 4f system 230. According to principle of Fourier optics, the middle focal plane in middle of the 4f system 230 may represent information on Fourier domain of an object after a low pass filtering. If the optical grating 240 is disposed on the middle focal plane of the 4f system 230, the lights having different wavelengths may be deflected by different angles respectively, and the lights having different angles may be converged into different points respectively on the image plane of the 4f system 230. This process is equivalent to multiplying by a phase factor in x direction of the Fourier domain, in which each of the different wavelengths corresponds to a different phase factor. Different phase factors of the Fourier domain may cause that point spread functions corresponding to different wavelengths are different. Image information is equal to a convolution of object information and a point spread function (PSF for short). The image sensor 250 can obtain image function (i.e. the image information) and the point spread functions corresponding to different wavelengths. After the image sensor 250 obtains the image function and the point spread functions corresponding to different wavelengths, the spectrum separation can be realized by using a deconvolution algorithm, thus realizing multi-spectrum imaging. For example, PSF modulation curves of two fluorescence spectrum bands are illustrated as FIG. 3, in which abscissa represents pixel coordinate of the sensor, and ordinate represents intensity of normalization.

In embodiments of the present disclosure, the image sensor 250 is a gray image sensor.

With the imaging system according to above embodiments of the present disclosure, the structure of the common fluorescence microscope system in the related art may be improved by adding the spatial mask and the 4f system, and spectrum separation and modulation may be performed by the optical grating, such that multi-spectrum imaging rate is significantly improved, and optical efficiency can be improved effectively, thus improving quality of the image.

In order to realize multi-spectrum imaging, embodiments of the present disclosure further provide an imaging method. The imaging method according to embodiments of the present disclosure is mainly based on following principles.

(1) Sparsity of an Image

Gray digital image can be represented by a two-dimensional matrix. The two-dimensional matrix is usually full rank. However, in the case of a set of over-complete dictionaries as a basic matrix, the gray digital image can be sparsely represented by a small number of variables. A purpose of the sparse representation is to represent an image by using as few atoms as possible in a given over-complete dictionary, thus obtaining a more concise way for represents the image. That is to say, under the basis matrix, the original image may be expressed as a set of new coordinates with a minimum zero-norm.

As a special kind of natural image, a microscopic image has sparsity. In addition, as similar biological structures usually have a sufficient similarity on morphology, the over-complete dictionary can be obtained by using sufficient training samples as priori inputs. Real image data can be obtained by obtaining a sparse representation under the over-compete dictionary after denoising and deblurring are performed on an actually taken microscopic image.

Figure 4:
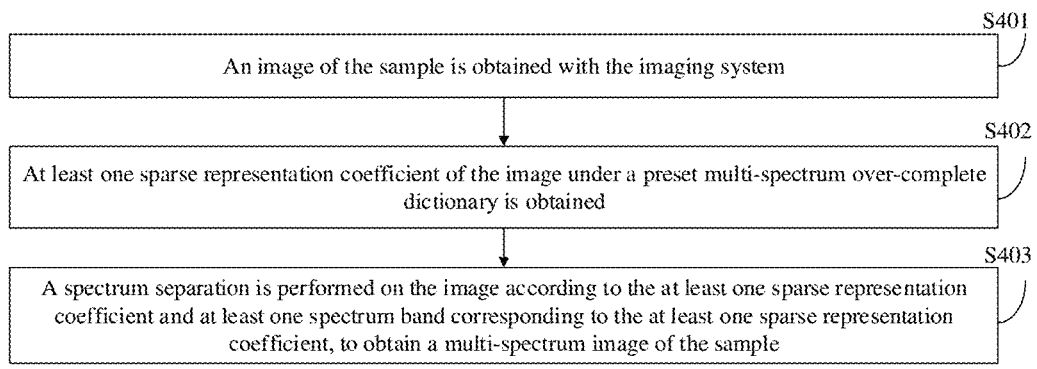
FIG. 4 is a flow chart of an imaging method according to an embodiment of the present disclosure.

FIG. 4 is a flow chart of an imaging method according to an embodiment of the present disclosure. As shown in FIG. 4, the method includes followings.

In block S401, an image of the sample is obtained with the imaging system.

Photographing the image of the sample with the imaging system can refer to embodiments of the above imaging system, which is not described in detail herein.

In embodiments of the present disclosure, pre-processing can be further performed on the photographed image of the sample, for example, denoising and deblurring.

In block S402, at least one sparse representation coefficient of the image under a preset multi-spectrum over-complete dictionary is obtained. The multi-spectrum over-complete dictionary includes a plurality of over-complete dictionaries corresponding to a plurality of spectrum bands respectively.

In block S403, a spectrum separation is performed on the image according to the at least one sparse representation coefficient and at least one spectrum band corresponding to the at least one sparse representation coefficient, to obtain a multi-spectrum image of the sample.

In embodiments of the present disclosure, the image is solved with K-SVD algorithm according to the preset multi-spectrum over-complete dictionary, to obtain the at least one sparse representation coefficient. K-SVD algorithm is a classical algorithm for training dictionary, in which, SVD division is performed on an error term according to a principle of minimum error, a division item which makes the error term to be minimum is selected as an updated dictionary atom and a corresponding atom coefficient, thus obtaining an optimized solution by iteration.

Figure 5:
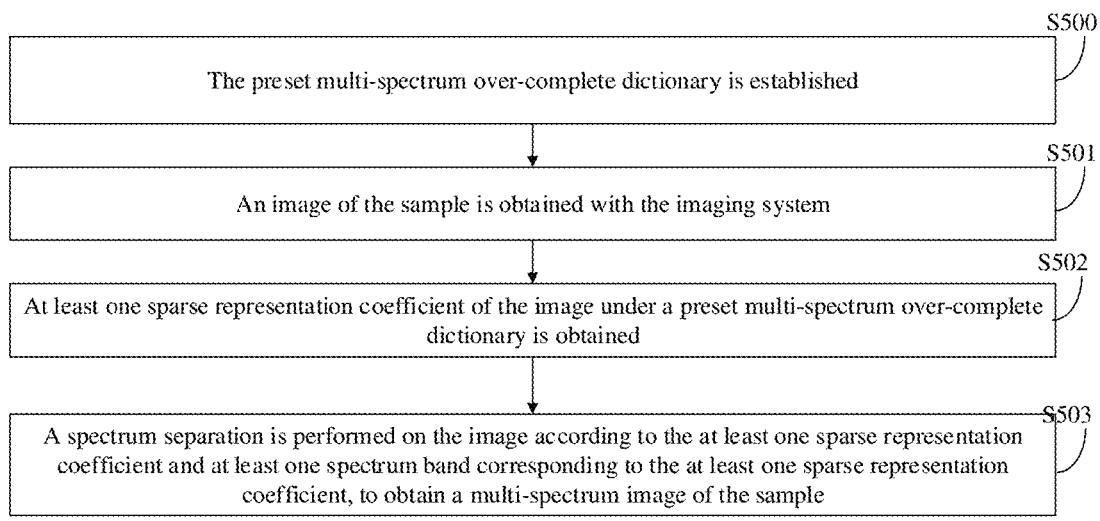
FIG. 5 is a flow chart of an imaging method according to an embodiment of the present disclosure.

FIG. 5 is a flow chart of an imaging method according to an embodiment of the present disclosure. As shown in FIG. 5, the method includes following steps.

In block S500, the preset multi-spectrum over-complete dictionary is established.

Establishing the preset multi-spectrum over-complete dictionary includes: labeling samples of different structures with different fluorescence, to obtain a plurality of multi-spectrum images; performing learning and training on the plurality of multi-spectrum images to obtain a plurality of original over-complete dictionaries, in which each of the plurality of original over-complete dictionaries corresponds to a spectrum band; obtaining a point spread function of the optical grating; performing convolution on the plurality of original over-complete dictionaries and the point spread function, to obtain the preset multi-spectrum over-complete dictionary.

Specifically, a large number of cells for training are cultivated, and different cell structures are labeled. Multi-spectrum images are obtained by using low-speed, high-resolution imaging systems (such as confocal microscopy). The over-complete dictionaries are learned by taking these multi-spectrum images as training samples corresponding to different spectrum bands. As different structures of cells are labeled by different spectrum bands of fluorescence, and the different spectrum bands of fluorescence may have different priori characteristics, a set of high quality over-complete dictionaries can be obtained as long as a number of the training samples is large enough.

In block S501, an image of the sample is obtained with the imaging system.

In block S502, at least one sparse representation coefficient of the image under a preset multi-spectrum over-complete dictionary is obtained. The multi-spectrum over-complete dictionary includes a plurality of over-complete dictionaries corresponding to a plurality of spectrum bands respectively.

In block S503, a spectrum separation is performed on the image according to the at least one sparse representation coefficient and at least one spectrum band corresponding to the at least one sparse representation coefficient, to obtain a multi-spectrum image of the sample.

In addition, a process for reconstructing the above multi-spectrum image is essentially a problem of solving matrix equations. In embodiments of the present disclosure, by performing mask modulation in space with spatial mask, the number of variables can be reduced, and an exact solution can be reconstructed better and more quickly in a case of a consistent number of constraining equations.

With the imaging method according to embodiments of the present disclosure, by taking advantage of inherent sparsity of nature image, wide field of view multi-spectrum imaging under a single exposure is realized according to the preset multi-spectrum over-complete dictionary.

Figure 6:
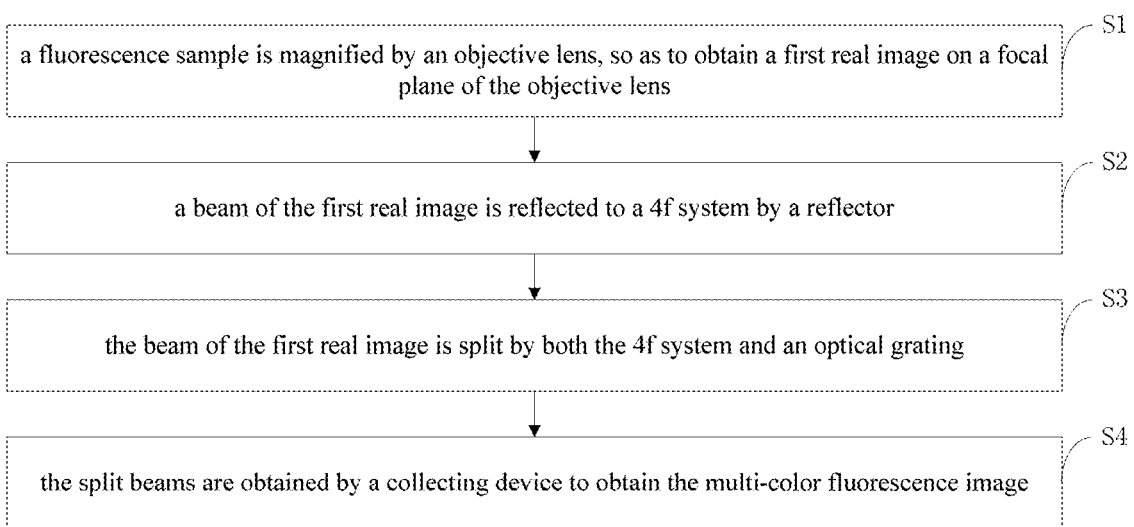
FIG. 6 is a flow chart of a method for multi-color fluorescence imaging under a single exposure according to an embodiment of the present disclosure.

FIG. 6 is a flow chart of a method for multi-color fluorescence imaging under a single exposure according to an embodiment of the present disclosure. As shown in FIG. 6, the method for multi-color fluorescence imaging under a single exposure according to an embodiment of the present disclosure includes followings.

In block S1, a fluorescence sample is magnified by an objective lens, so as to obtain a real image on a focal plane of the objective lens.

In block S2, a beam of the real image is reflected to a 4f system by a reflector.

The reflector is disposed on the focal plane of the objective lens, and the focal plane of the objective lens is a front focal plane of the 4f system.

In block S3, the beam of the real image is split by both the 4f system and an optical grating.

The optical grating is disposed on a focal plane in middle of the 4f system.

In block S4, the split beams are obtained by a collecting device to obtain the multi-color fluorescence image.

In an embodiment of the present disclosure, the optical grating deflects the beam having different wavelengths with different angles respectively, to realize splitting.

In an embodiment of the present disclosure, the collecting device realizes spectrum separation by a convolution algorithm.

With the method for multi-color fluorescence imaging under a single exposure according to the embodiments of the present disclosure, the 4f system is added behind the objective lens that has a structure of the ordinary fluorescence microscope, the optical grating is used in the middle of the 4f system for spectrum separation, and for performing modulation in Fourier domain, and finally deconvolution algorithm is used to the image obtained by the collecting device for spectrum separation, thus improving imaging rate in multi-spectrum fluorescence microscopy technology.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. An imaging method, applied in an imaging system, wherein the system comprises: a fluorescence microscope, wherein the fluorescence microscope comprises a laser source and an objective lens, a sample is disposed on a focal plane of the objective lens, the laser source is configured to emit lasers to illuminate the sample, and the objective lens is configured to magnify the sample illuminated by the lasers to an image plane of the objective lens, to obtain a real image of the sample; a spatial mask, disposed on the image plane of the objective lens, and configured to perform mask modulation on the real image of the sample; a 4f system, disposed behind the spatial mask, wherein a beam of the real image of the sample passes through the spatial mask to the 4f system; an optical grating, disposed on a Fourier plane in middle of the 4f system, and configured to split the beam of the real image of the sample to obtain split beams of the real image; and an image sensor, configured to obtain the split beams of the real image to obtain an image of the sample, and the method comprises:

obtaining an image of the sample with the imaging system;

obtaining at least one sparse representation coefficient of the image under a preset multi-spectrum over-complete dictionary, wherein the multi-spectrum over-complete dictionary comprises a plurality of over-complete dictionaries corresponding to a plurality of spectrum bands respectively;

performing a spectrum separation on the image according to the at least one sparse representation coefficient and at least one spectrum band corresponding to the at least one sparse representation coefficient, to obtain a multi-spectrum image of the sample.

2. The method according to claim 1, wherein obtaining at least one sparse representation coefficient of the image under a preset multi-spectrum over-complete dictionary comprises:

solving the image with K-SVD algorithm according to the preset multi-spectrum over-complete dictionary, to obtain the at least one sparse representation coefficient.

3. The method according to claim 1, further comprising: establishing the preset multi-spectrum over-complete dictionary, wherein establishing the preset multi-spectrum over-complete dictionary comprises:

labeling samples of different structures with different fluorescence, to obtain a plurality of multi-spectrum images;

performing learning and training on the plurality of multi-spectrum images to obtain a plurality of original over-complete dictionaries, wherein each of the plurality of original over-complete dictionaries corresponds to a spectrum band;

obtaining a point spread function of the optical grating;

performing convolution on the plurality of original over-complete dictionaries and the point spread function, to obtain the preset multi-spectrum over-complete dictionary.

4. The method according to claim 1, wherein the sample is a fluorescence sample, the method further comprising:

magnifying the fluorescence sample by the objective lens, to obtain the real image on the focal plane of the objective lens;

reflecting a beam of the real image by a reflector to the 4f system, wherein the reflector is disposed on the focal plane of the objective lens, and the focal plane of the objective lens is a front focal plane of the 4f system;

splitting the beam of the real image by both the 4f system and the optical grating into the split beams of the real image, wherein the optical grating is disposed on a focal plane in middle of the 4f system; and obtaining the split beams by a collecting device to obtain a multi-color fluorescence image.

5. The method according to claim 4, further comprising: deflecting, by the optical grating, the beam having different wavelengths with different angles respectively, to realize splitting.

6. The method according to claim 4, wherein the collecting device realizes spectrum separation by a convolution algorithm.

\* \* \* \* \*